United States Patent [19]

Menil

[11] 3,754,298
[45] Aug. 28, 1973

[54] SPECTACLES, GOGGLES AND THE LIKE
[75] Inventor: Raymond Louis Menil, Bois-Colombes, France
[73] Assignee: Tagada S. A., Hauts - de - Seine, France
[22] Filed: Mar. 18, 1971
[21] Appl. No.: 125,725

[52] U.S. Cl. .............................................. 15/250.3
[51] Int. Cl. ............................................ B60s 1/22
[58] Field of Search ..................... 15/250.3, 250.27, 15/250.28; 2/14 K, 14 N; 272/27 N, 27 W, 1 R; 351/158, 62

[56] References Cited
UNITED STATES PATENTS
| 905,295 | 12/1908 | Moulin | 272/27 W |
| 1,509,699 | 9/1924 | Atchison | 15/250.27 |
| 1,669,285 | 5/1928 | Conill | 15/250.3 |
| 2,721,352 | 10/1955 | Oishei | 15/250.16 X |
| 2,888,703 | 6/1959 | Karwowska | 15/250.27 |
| 2,971,196 | 2/1961 | Howell | 2/14 R |

FOREIGN PATENTS OR APPLICATIONS
| 413,447 | 7/1934 | Great Britain | 15/250.3 |
| 800,176 | 8/1958 | Great Britain | 15/250.27 |

Primary Examiner—Peter Feldman
Attorney—William Anthony Drucker

[57] ABSTRACT

Spectacles, goggles and the like having glasses or lenses comprise wipers therefore mounted pivotably in front of an outer surface thereof, a frame, and driving means for the wipers mounted in said frame. To provide a toy in the form of a practical joke, the mounting may have an orifice forming a nozzle for projecting a liquid, said orifice comprising a ferrule for connection to a conduit for the liquid.

2 Claims, 6 Drawing Figures

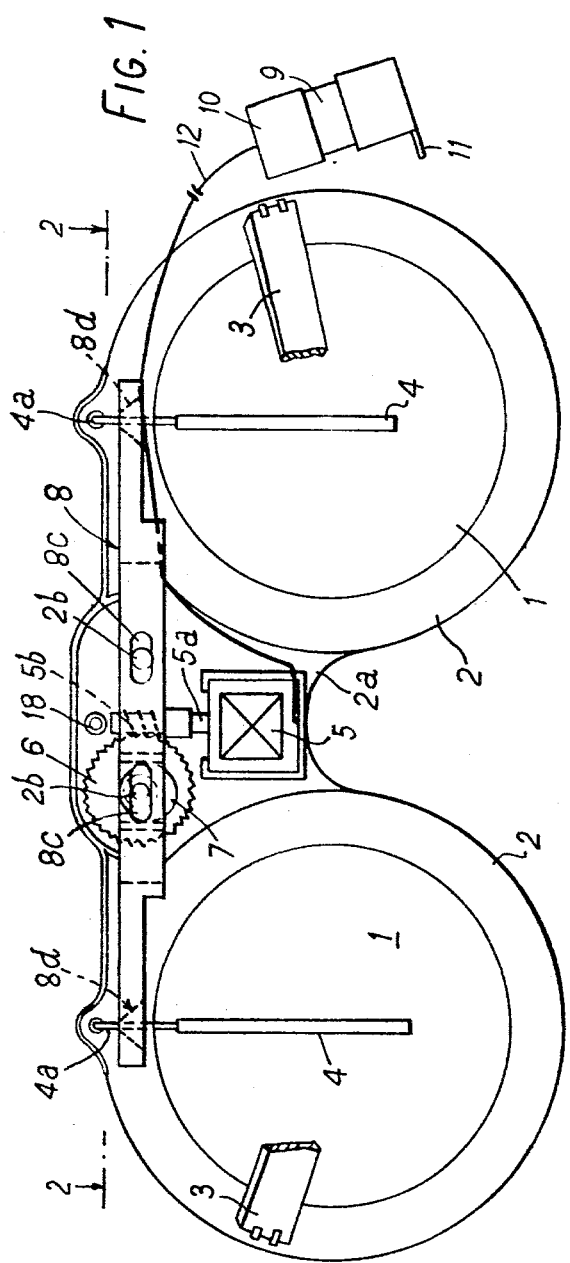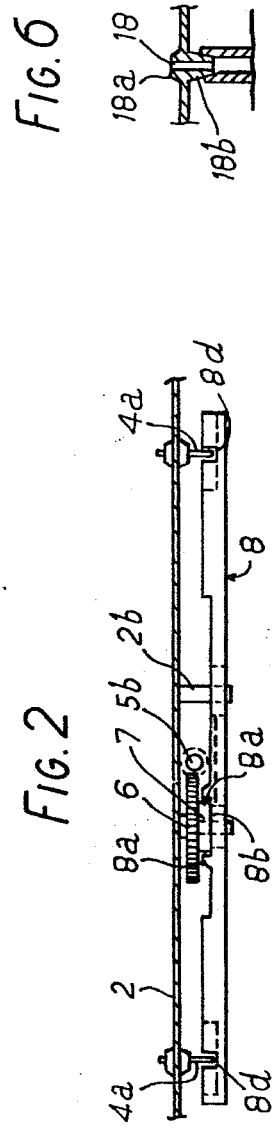

# SPECTACLES, GOGGLES AND THE LIKE

The present invention relates to spectacles and other optical instruments, comprising means for wiping or sweeping glasses or eyepieces.

A particular application of the invention is in the construction of gadgets or toys in the form of practical jokes and hoaxes; another object of the invention is the manufacture of optical instruments which are intended to be used in a dirtying environment: in fog, rain, snow, smoke, in the laboratory, workshop and the like. For example, spectacles or goggles according to the invention may be used to advantage by skiers or motorcyclists, during downpours of rain or snow.

According to one feature of the invention, the spectacles are equipped with wiping means for the glasses or eyepieces.

According to another feature, the means for actuating the wiping means are located in the bridge member connecting the rims of the glasses.

According to yet another feature, the means for actuating the wiping arrangement for the glasses is remote controlled.

The invention will be further described, by way of example, with reference to the accompanying drawings, in which:

FIG. 1 is a view of the inside of a pair of goggles, constructed in accordance with a preferred embodiment of the invention, with a cover of a housing containing a wiper driving means removed.

FIG. 2 is a plan view with parts seen in cross-section taken along the line 2—2 in FIG. 1.

FIG. 6 shows an adaptation of the assembly for providing a nozzle for projecting a liquid, in an application of the invention suitable for a toy in the form of a practical joke.

Figure 3:
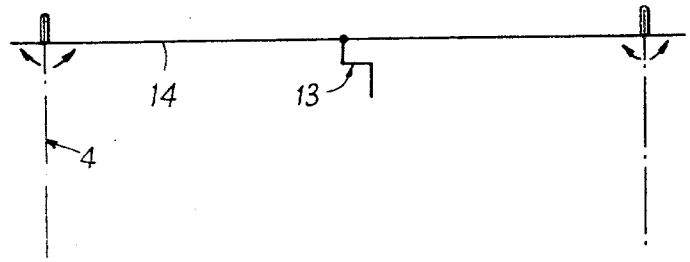
FIGS. 3, 4 and 5 show diagrammatically modifications of the actuating device for goggle wipers.

Referring now more particularly to FIG. 1 of the drawings, this figure shows a pair of goggles comprising, as known in the art, two glasses 1 retained by a mounting or surround 2 on which side members 3 are hingedly mounted. This frame may be made from any suitable material and may, for example, be a plastics moulding.

The bridge 2a of this mounting is constructed to form a housing adapted to receive a driving means for wipers 4 made, as known per se, from a rubber blade mounted on an arm of metal or the like. In a particular embodiment of the invention, the driving means for the wipers comprises a small electric motor 5, the output shaft 5a of which has an endless screw 5b which meshes with a toothed wheel 6 mounted loosely on a spindle 2b forming an integral part of the bridge 2a and which can be moulded at the same time as said bridge.

The wheel 6 is integral with an eccentric cam 7. This cam engages the edges 8a of a frame or mounting 8b provided in a rod 8.

This rod 8 has oblong holes 8c guiding it along the axis 2b and a second spindle or stud 2b' which is also made in one piece with the mounting and is located at a suitable distance from the first spindle.

In addition, the rod 8 is held in position by the cover of the housing (not shown) which is screwed over the assembly.

Near each end of the rod, which ends are narrower than the centre portion, the rod has a mounting or bearing 8d into which engages the end 4a of the supporting rod of the wiper, mounted pivotably in the hole in the bearing 2. This end may be curved towards the bottom, whilst the mounting 8d may have a trapezoidal cross-section in order to facilitate the movement of the said end 4a.

It follows that the motor, via the endless screw 5b forming its output shaft, drives the wheel 6 and the latter actuates during its rotation the cam 7, which forms part of this wheel. The cam 7 translates this movement into a rectilinear reciprocating movement of the rod 8 which is transferred to the wipers 4 and causes them to carry out an oscillating wiping movement. It may be seen that this construction offers particular advantages in that it makes it possible to house the driving means within a very small space, and in that these means comprise a small number of constituent elements.

Moreover, the starting and stopping of the motor may advantageously be remote controlled. The battery 9, or other current source, located in a housing 10, equipped with a switch 11, is connected to the goggles in this embodiment by wires 12.

Obviously, although the driving means just described form an interesting embodiment of the invention, the invention is not limited thereto.

Thus, it is easy to provide, for the system described above, a drive in which mechanical devices are used, such as spring motors or the like.

Similarly, the displacement of the wipers may be achieved by various means.

As shown diagrammatically in FIG. 3, the motor may drive a crank 13 which is mounted pivotably on a rod 14, each end of which is connected to the corresponding end of the support rod of the wiper.

This crank may be formed directly by the output shaft of the motor, or else it may be driven through a system of reduction gears.

Figure 4:
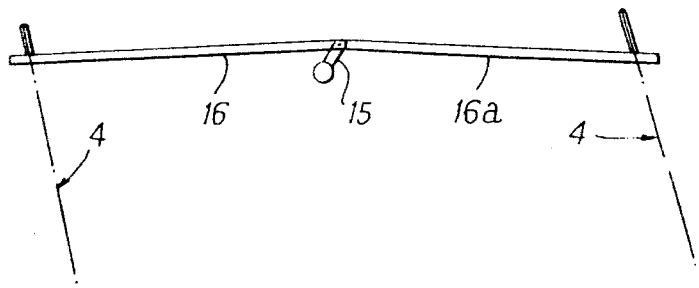

According to another embodiment of the invention, shown in FIG. 4, the motor drives a crank 15; the ends of the two rods, 16, 16a, are pivotally mounted to the crank pin and each carry on their remote ends the support rods of a wiper.

Figure 5:
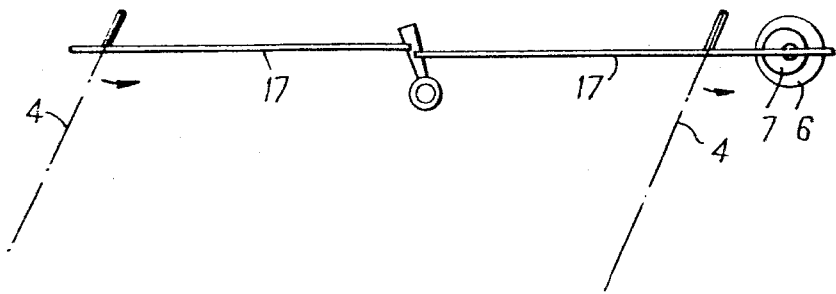

In a third embodiment, the driving means for the wiper arrangement may be provided in one of the side pieces of the goggles as shown in FIG. 5.

In this case, the cam, crank or other means causes the reciprocating rectilinear movement of a rod 17, which may be in one or several parts, and to which the ends of the wiper support rods are pivotably connected.

It should also be noted that when the goggles or similar object is constructed for use as a toy, practical joke or the like, they may be equipped with means for projecting a jet of liquid such as water. FIG. 6 illustrates a mounting arrangement constructed for this purpose. The mounting 2 may have, at any suitable point, an orifice 18 the outer edge of which extends into a circular nozzle 18a, which acts as a jet nozzle, whilst the inner edge of this orifice has a ferrule 18b adapted to be connected to a conduit for the liquid, for example a squeeze bulk.

It should be noted that although the above describes, by way of example, an application of the invention to goggles which may be sold as gadgets or toys, or as utilitarian objects, for skiers, motor cyclists or other users, the invention may also be applied to other articles of this kind, such as monocles, lorgnettes etc.

I claim:

1. In spectacles comprising the combination of a frame carrying lenses or eye pieces, wipers mounted to oscillate against the external front surface of the said lenses or eye-pieces and means moving said wipers, the improvement comprising a small electric motor located in the lower part of a closed box formed in the nasal bridge joining the circular lens-rims of the frame, the said motor driving, through the intermediary of a worm-gear located on the axis of its vertical output shaft, a pinion fixed to a cam turning in a housing which contains a cam-rod placed above said motor and located in the upper part of the box, said rod acting, at its opposite ends, on the ends of wiper-blade supports, in order to apply oscillatory wiping movements to said wiper blades.

2. Spectacles according to claim 1, characterized in that said rod comprises, near each of its ends, a recess of trapezoidal section (or V-shaped recess) in which is located the bent internal end of a wiper blade mounting.

* * * * *